March 12, 1940.  A. WINTHER ET AL  2,193,185
TEMPERATURE CONTROL APPARATUS
Filed April 26, 1937  9 Sheets-Sheet 1
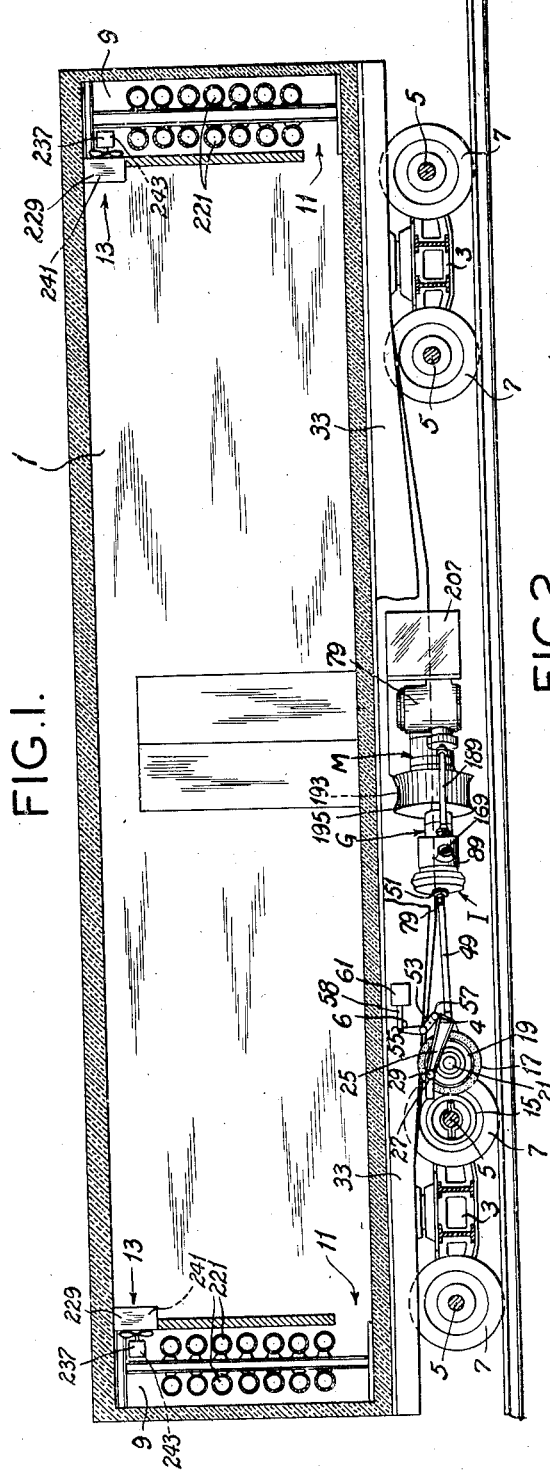
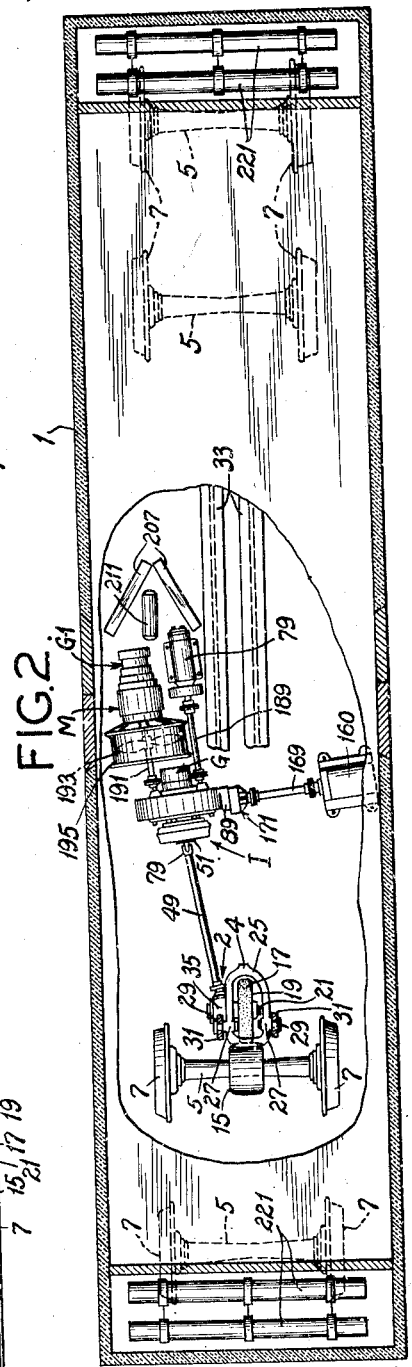
Anthony Winther,
Martin P. Winther,
Mark Kindt,
Inventors
Delos G. Haynes,
Attorney March 12, 1940. A. WINTHER ET AL 2,193,185
TEMPERATURE CONTROL APPARATUS
Filed April 26, 1937 9 Sheets-Sheet 2
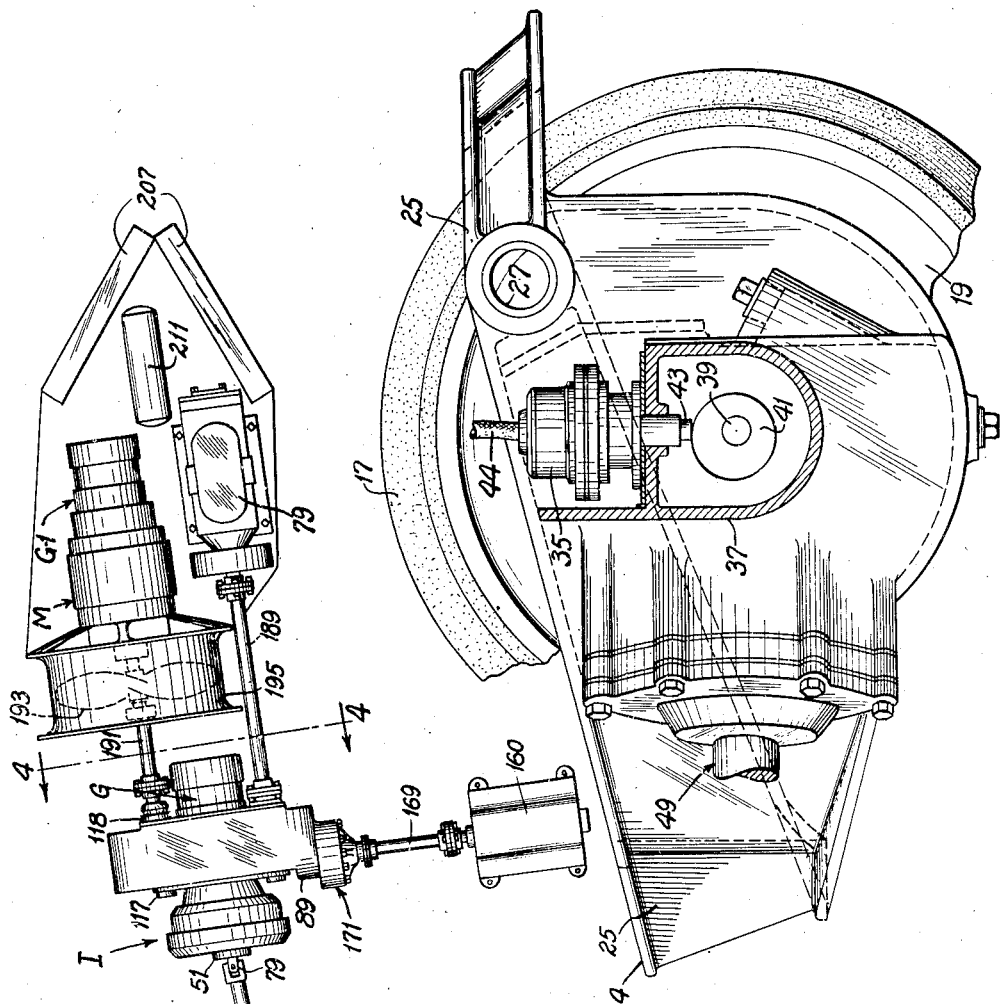
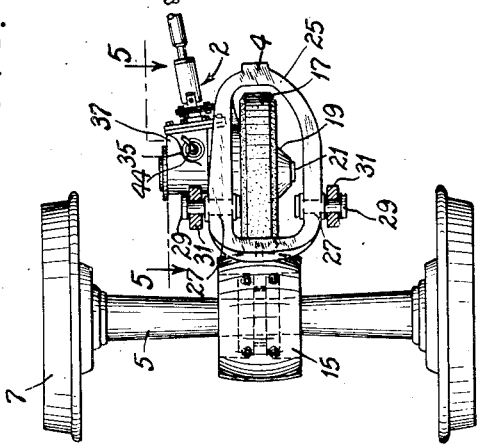
Anthony Winther,
Martin P. Winther,
Mark Kindt,
Inventors.
Delos G. Haynes,
Attorney.

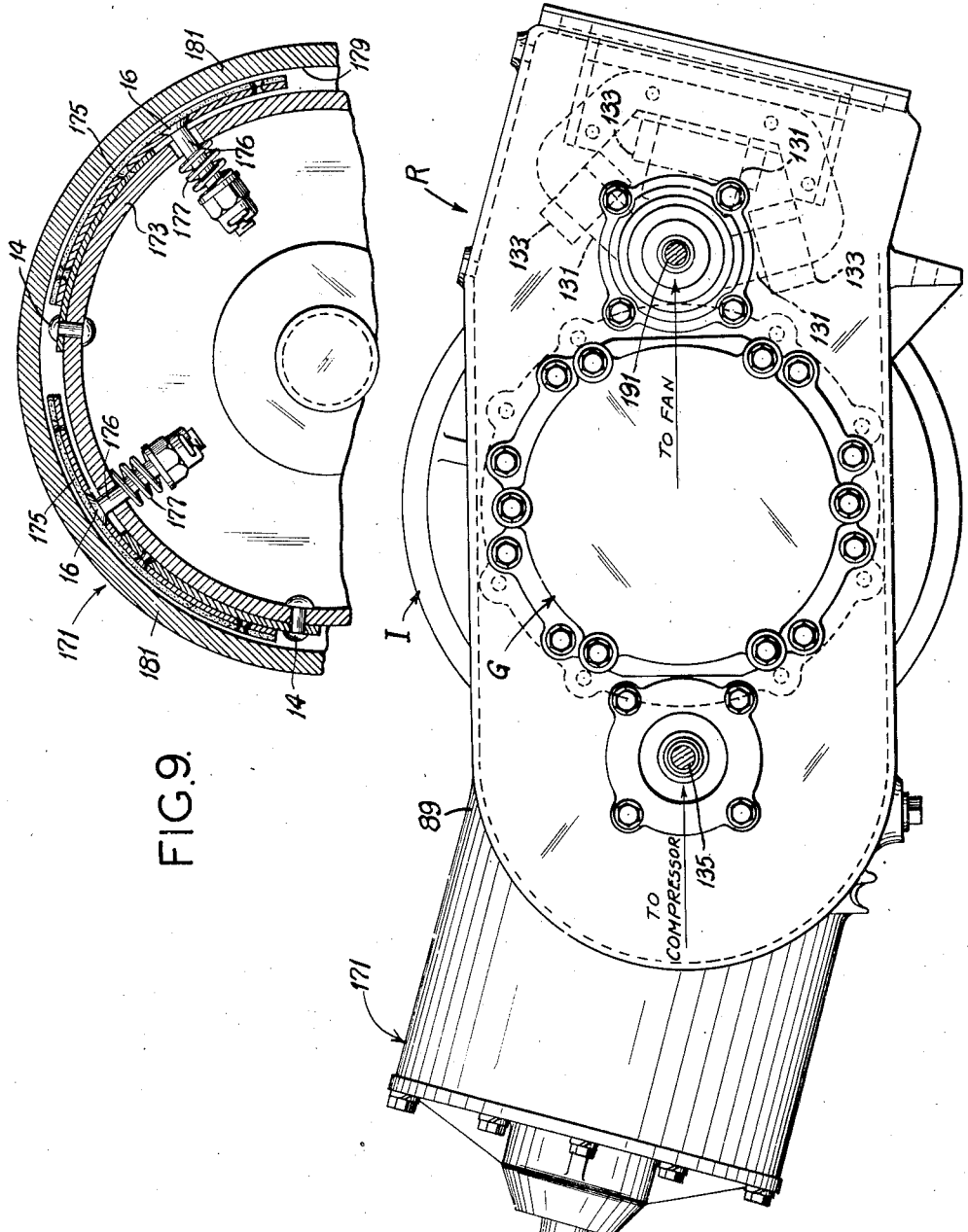

March 12, 1940.    A. WINTHER ET AL    2,193,185
TEMPERATURE CONTROL APPARATUS
Filed April 26, 1937    9 Sheets-Sheet 4

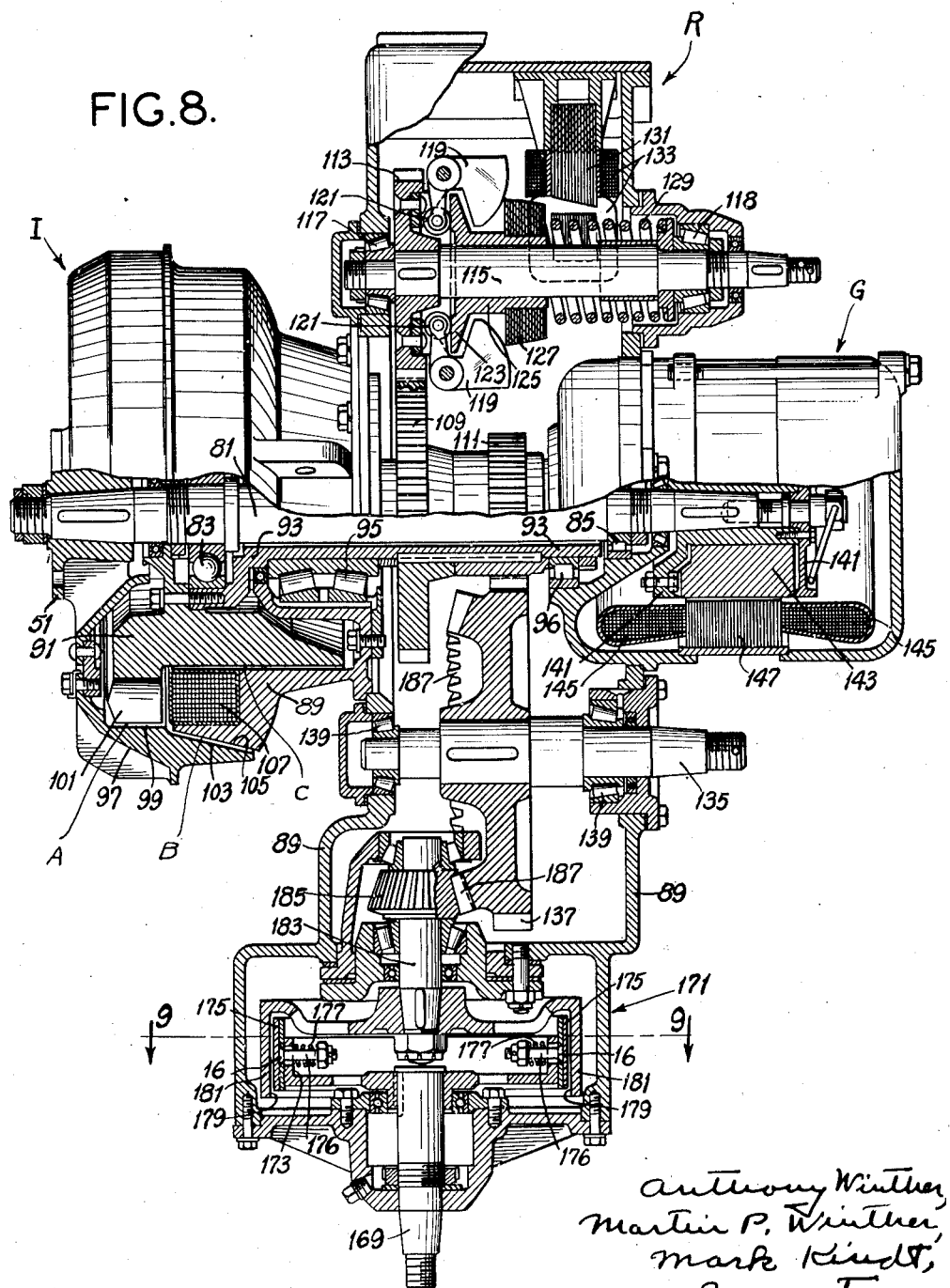

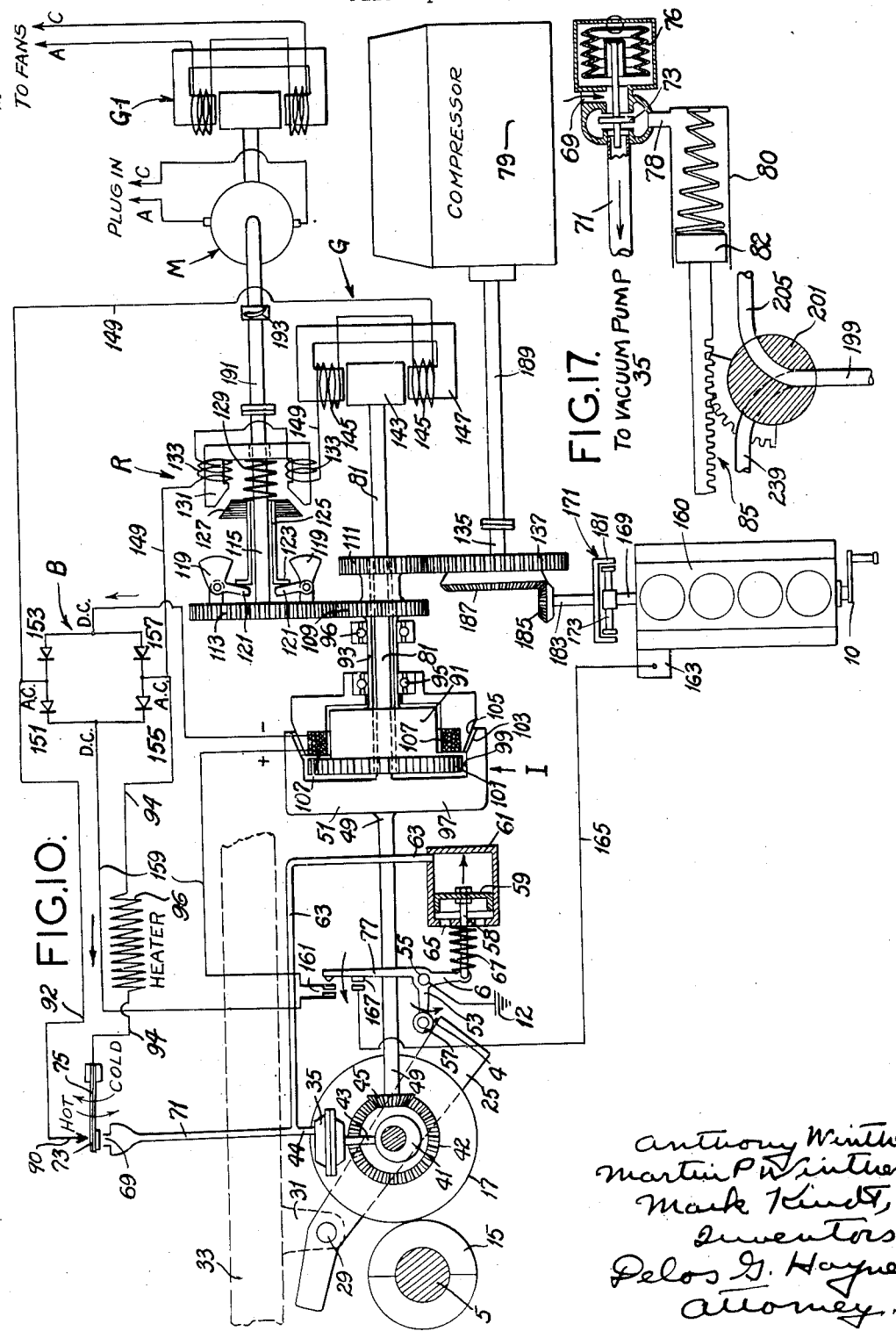

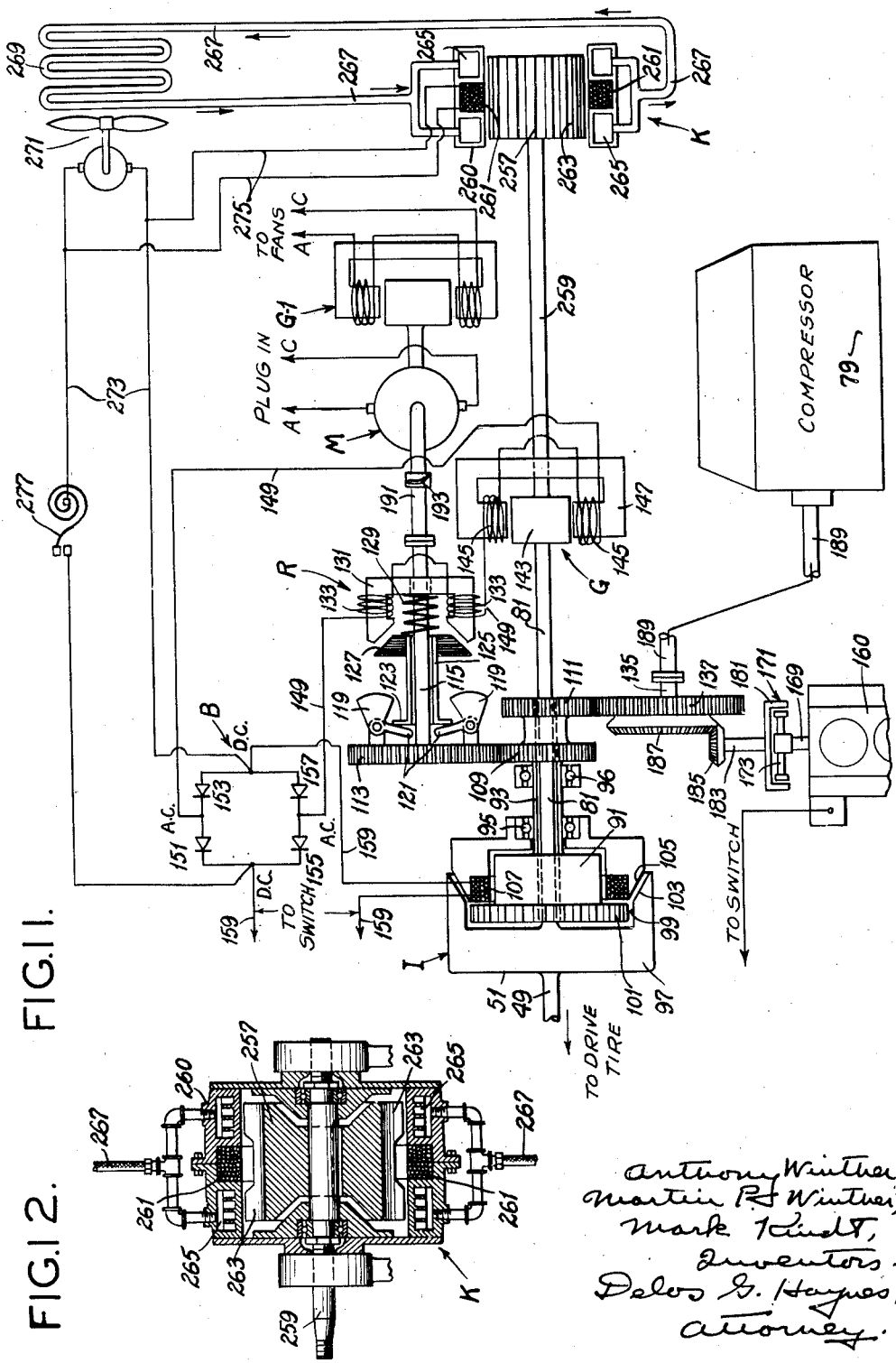

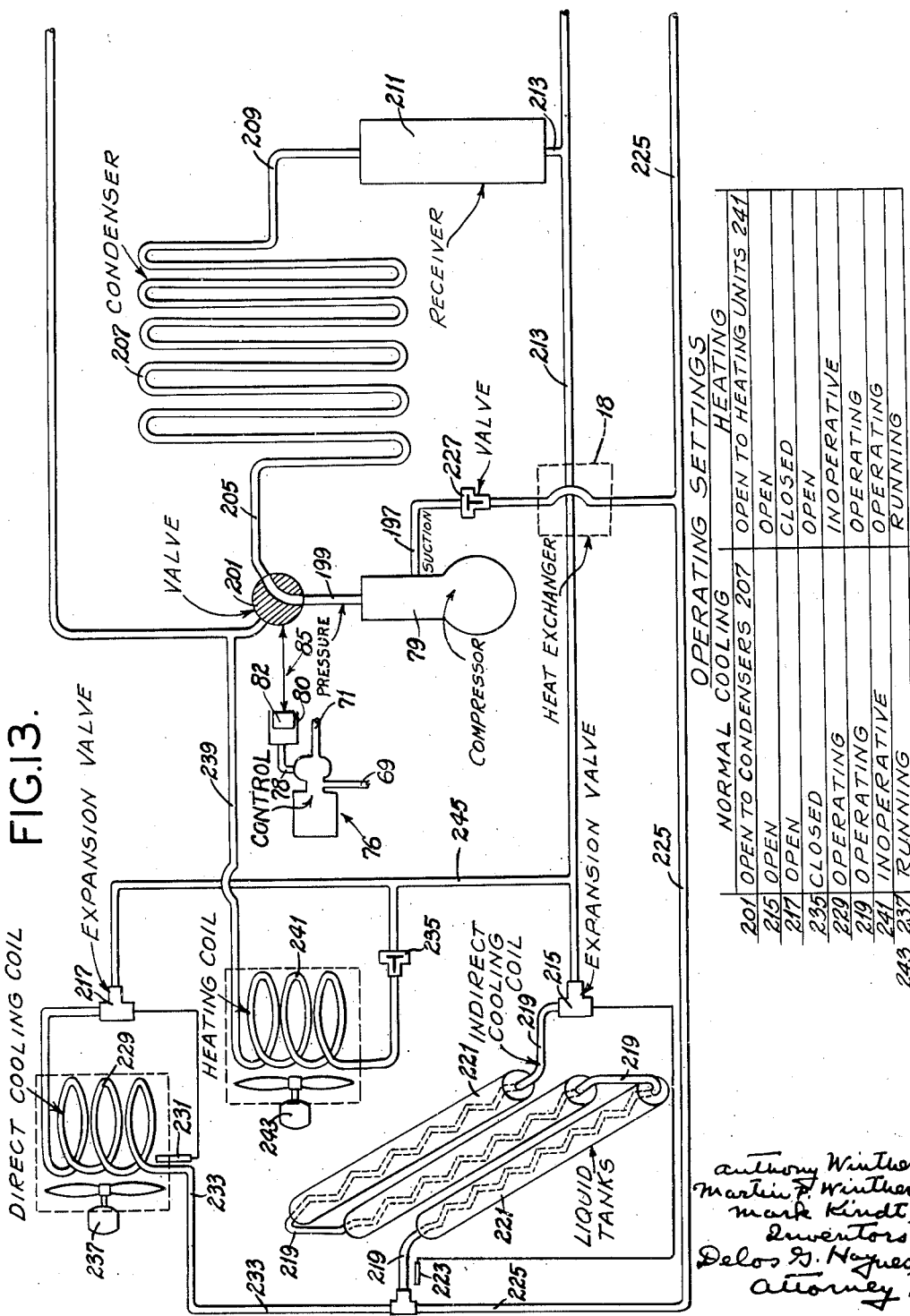

March 12, 1940.  A. WINTHER ET AL  2,193,185
TEMPERATURE CONTROL APPARATUS
Filed April 26, 1937   9 Sheets-Sheet 9
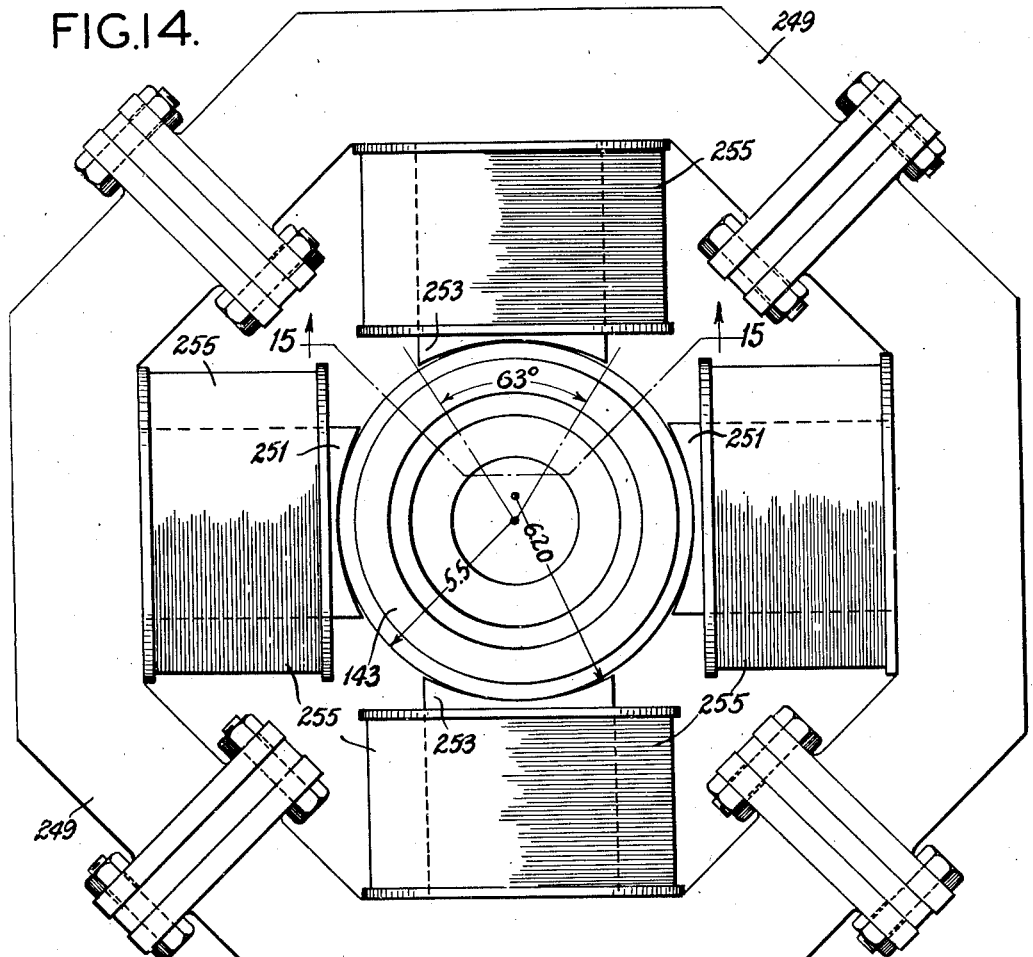
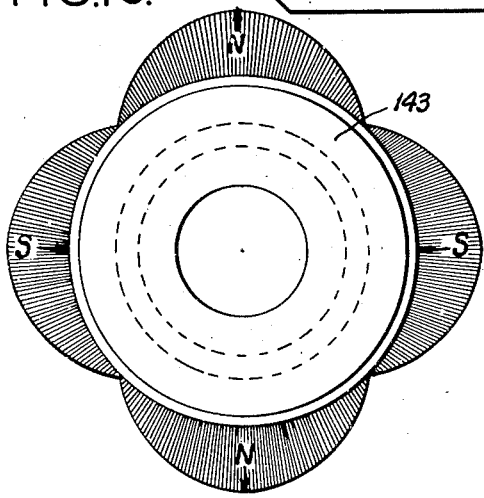
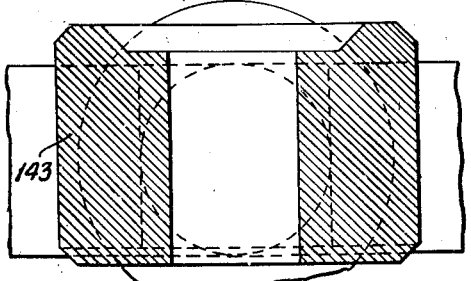
Anthony Winther,
Martin P. Winther,
Mark T. Kindt
Inventors.
Delos G. Haynes,
Attorney Patented Mar. 12, 1940

2,193,185

UNITED STATES PATENT OFFICE 2,193,185

TEMPERATURE CONTROL APPARATUS

Anthony Winther, Kenosha, Wis., and Martin P. Winther, Waukegan, Ill., and Mark Kindt, Kenosha, Wis.

Application April 26, 1937, Serial No. 138,986

24 Claims. (Cl. 171—313)

This invention relates to temperature control apparatus for vehicles, and with regard to certain more specific features to apparatus of this class in which driving is effected from a moving part of the vehicle.

Among the several objects of the invention may be noted the provision of apparatus for maintaining a predetermined temperature within a vehicle, such as a freight car, when the vehicle is in an outside atmosphere of a temperature which is either higher or lower than said predetermined temperature; the provision of apparatus of the class described which is effective to maintain the predetermined temperature while the car is moving or while it is stationary, and in the latter case both when it is at a source of electric energy and when it is not; the provision of apparatus of the class described which is adapted to operate effectively under adverse conditions, requiring little adjustment or repair over long periods; and the provision of apparatus of the class described which is compact in form and which is economical compared to the present method of partial temperature control.

Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a longitudinal section taken through a refrigerator car showing application of the invention thereto;

Fig. 2 is a plan view of Fig. 1, parts being broken away to show certain features in plan view;

Fig. 3 is an enlarged plan view of the running gear shown in Fig. 2;

Fig. 4 is a cross section taken on line 4—4 of Fig. 3;

Fig. 5 is an enlarged vertical section taken on line 5—5 of Fig. 3, parts being broken away to indicate details;

Fig. 8 is an enlarged plan view of certain portions of Fig. 3, parts being broken away to show details;

Fig. 9 is a vertical section taken on line 9—9 of Fig. 8;

Fig. 10 is a diagrammatic electrical and mechanical layout basically illustrating one form of the invention;

Fig. 11 is a view similar to Fig. 10, but illustrating a modified form of the invention;

Fig. 12 is a longitudinal section of certain heating apparatus shown in Fig. 11;

Fig. 13 is a diagrammatic layout of a refrigerating and heating circuit;

Fig. 14 is a plan view of apparatus used for armature polarization;

Fig. 15 is a section taken on line 15—15 of Fig. 14;

Fig. 16 is a diagrammatic view showing certain armature polarization characteristics; and, Fig. 17 is a diagrammatic view of an alternative vacuum control apparatus.

Similar reference characters indicate corresponding parts throughout the several views of the drawings.

Figure 6:
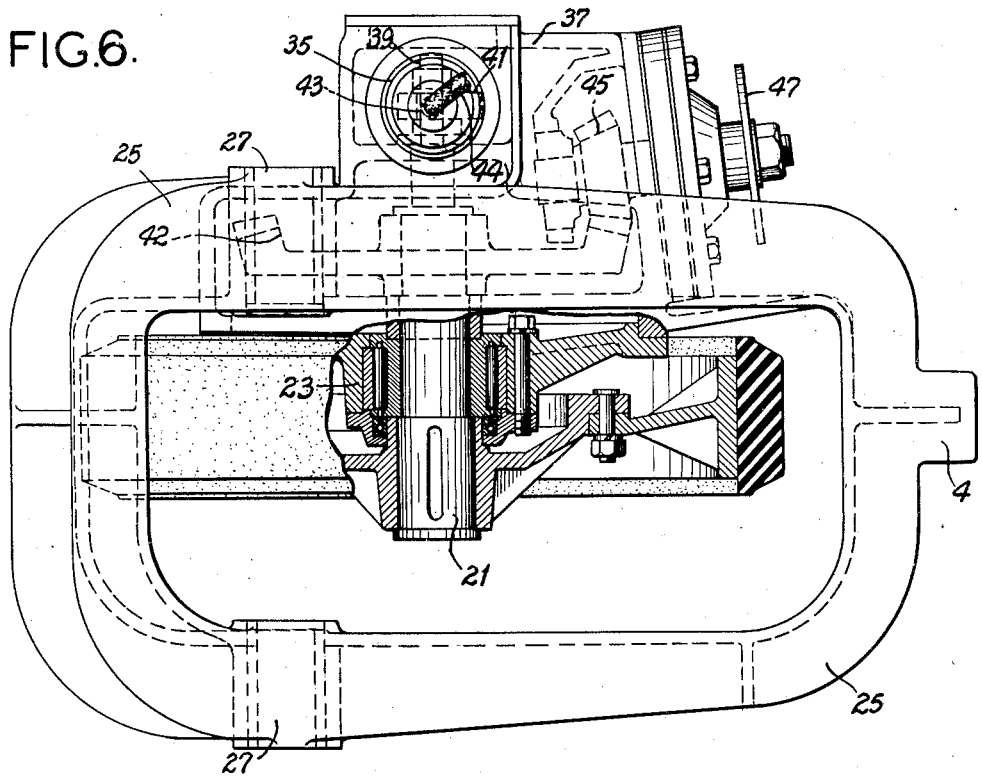
Fig. 6 is a plan view of the parts shown in Fig. 5, except that they are in a position corresponding to the same parts shown in Fig. 3, portions being broken away to show details.

Referring now more particularly to Fig. 1, there is shown at numeral 1 the insulated body of a refrigerator car which is supported upon suitable trucks 3, the latter being supported upon axles 5 and associated wheels 7. In the ends of the car 1 are suitable refrigerating compartments 9 having intake ducts 11 at their lower ends and exhaust ducts 13 at their upper ends. In the exhaust ducts are located heat exchange apparatus.

Figure 7:
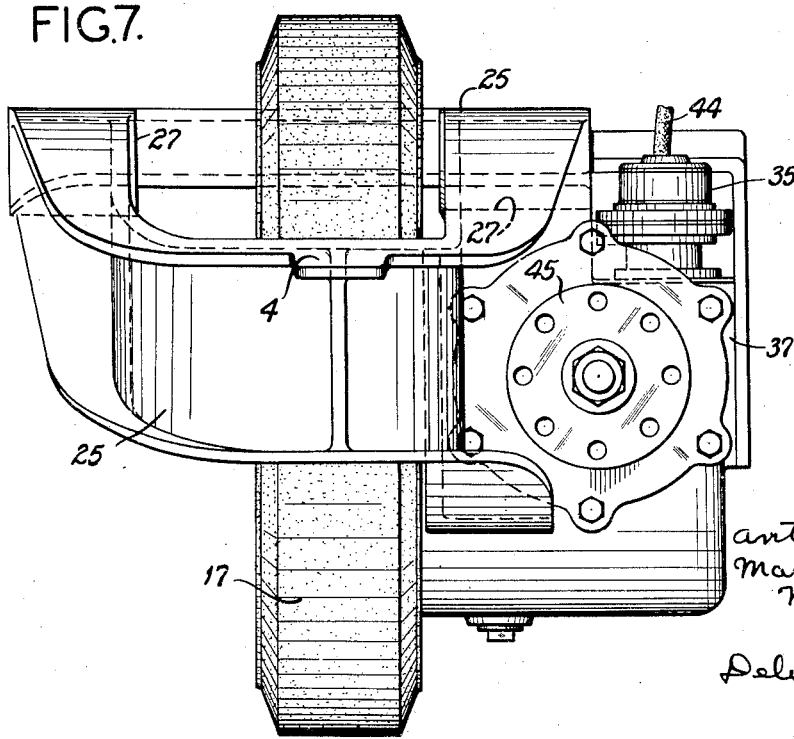
Fig. 7 is a right-end view of Fig. 6.

One of the axles 5 (Figs. 1–3) has clamped thereto a metal drum 15 having a rounded surface for engagement with a solid rubber tire 17 of a wheel 19. The wheel 19 is carried upon and keyed to a journal 21 (Figs. 5–7). The journal 21 extends through a bearing 23 which is supported within a swinging frame 25. The frame 25 swings on bearings 27 which are carried upon journals 29 (Figs. 2 and 3). The journals 29 are carried in supports 31 associated with the frame 33 of the car 1. The center line of the journals 29 is so arranged with respect to the center line of the wheel 19 and of the drum 15 that the tire 17 normally gravitates toward and rests against said drum 15. The surface of the drum 15 is arcuate, and its horizontal radius of curvature at the point of contact with the tire 17 has its center at or near the center of pivoting of the corresponding car truck, so that as the truck swivels with respect to the frame 33 upon a curve, the tire 17 can traverse the surface of the drum 15 without much movement of the frame 25.

Gravity, by reason of the weight of the parts associated with the frame 25, is enough to effect a substantial driving friction between the drum 15 and the tire 17 so that a diaphragm-type, suction pump 35 which is carried upon a housing 37 associated with the frame 25 may always be driven. As shown in Fig. 6, the journal 21 has associated therewith in the housing 37 an extension 39 which carries a cam 41 (see also Fig. 5). The cam 41 drives a follower 43 which operates the suction pump 35. As stated, friction between the drum 15 and tire 17 due to the weight of the parts on the frame 25 is normally enough to drive said pump 35 to effect a vacuum in a line 44 leading therefrom (Figs. 5 and 10). Although the line 44 is sometimes open to the atmosphere, in which event a vacuum therein would be broken, it is to be understood that when the line is cut off from the atmosphere, as it may be, that the pump will automatically draw a vacuum therein, as long as the car is moving.

The journal 21 also has keyed thereto a bevel gear 42 which drives a bevel pinion 45 journaled in said housing 37. The pinion 45 drives a flange 47 with which, through a known universal joint and spline connection 2, is connected with a drive shaft 49. The drive shaft 49 extends to and connects with (through another universal joint 79) a flange 51 of an inductor unit shown generally at I. The inductor I operates electromagnetically and through it is driven the refrigerating apparatus to be described.

Inasmuch as the load to be driven by the inductor I is greater than could be overcome by frictional force between the drum 15 and tire 17, as determined by gravity action alone of the frame 25, provision is made for increasing the pressure between the drum 15 and tire 17. The pressure mechanism (Figs. 1 and 10) is constituted by a bell-crank 53 pivoted at 55 to a suitable point on the frame 33. One of the arms of the bell-crank 53 carries a pressure roller 57 which engages a flat 4 on the frame 25 to press the frame downwardly upon proper rotation of the bell-crank 53. Fig. 1 shows this bell-crank merely diagrammatically, for clarity.

Another arm 6 of the bell-crank 53 is articulated with a piston rod 58 which carries a piston 59 sliding in a cylinder 61, the latter, as shown in Fig. 10, being in communication with said pipe 44 by way of a pipe 63. The side of the piston 59 adjacent the rod 57 is open to the atmosphere as indicated by ports 65. A compression spring 67 normally draws piston 59 to the left and forces the bell-crank 53 to released position with respect to pressure on the frame 25. This condition occurs whenever there is no vacuum drawn in the cylinder 61.

No vacuum is drawn in cylinder 61 whenever the inlet opening 69 of another communicating pipe 71 is open. The inlet opening 69 is under control of a valve 73 carried on the end of a bi-metallic, temperature-responsive, control member 75 which is positioned within the confines of the car 1 and responds to temperature differences therein. When the car temperature increases beyond a predetermined point, the bi-metallic member 75 moves to close the inlet 69, whereupon the constantly moving suction pump 35 draws a vacuum in the line 63 and cylinder 61.

Whenever a vacuum is drawn in the cylinder 61, the piston 59 is drawn to the right, thereby, through bell-crank 53, pressing down the frame 25 to induce a greater tangential driving force between the drum 15 and tire 17. Thus the high pressure between the tire 17 and drum 15 is employed only when required to drive the temperature controlling apparatus. Otherwise only the low-pressure driving effect is used for continuously operating the pump 35.

An auxiliary arm 77 on the bell-crank 53 serves to control certain switches for effecting electrical drive to the compressor and the like, and which will be described in proper order.

In Fig. 17 is shown an alternative thermostatic control in which like numerals designate like parts. In this form the bellows type of thermostat 76 is substituted for the bi-metal type 75 of Fig. 10. Upon heating, a volatile in the bellows 76 expands to cause valve 73 to close off the inlet 69 from suction pipe 71. The apparatus of Fig. 17 has other features which will be described later in connection with certain alternative heating means.

The temperature controlling apparatus includes a compressor 79 (Fig. 10) which is to receive energy from the drive shaft 49. The apparatus for transmitting this energy is shown in Figs. 4, 8 and 10.

The drive shaft 49, through universal joint 79, is coupled to a quill 81 (Fig. 8) which is supported within bearings 83 and 85. The bearings 85 are within a housing which is indicated generally at numeral 89, the same supporting various rotating parts, as will be shown. The other bearing 83 is within a relatively rotatable driven member 91 which is carried upon an outer and hollow quill 93. The hollow quill 93 is supported within bearings 95 and 96 within said housing 89.

The driving quill 81 has keyed thereto a magnetic cup or drum 97 which has an inner, smooth, magnetic-flux-receiving face 99 adjacent flux-concentrating teeth 101 upon the periphery of the driven member 91. The magnetic drum 97 also has a smooth face 103 adjacent an outer smooth face 105 of the enclosing frame 89. The portion of the frame 89 adjacent the face 105 is magnetic and carries a peripheral electromagnet 107.

The electromagnet 107 is of toric shape and sets up a toric magnetic field which passes through (1) the magnetic drum 97, (2) the adjacent magnetic portion of the housing 89, (3) through the main body of the driven member 91 (this is also magnetic at this point), and (4) through the teeth 101, traversing three flux gaps respectively between members 101 and 97 (a toothed gap); 97 and 89 (a smooth gap); and 89 and 91 (a smooth gap), indexed as A, B and C respectively. The inductive, eddy-current effects cause translation of rotation from the driving member 97 to the driven member 91, the drive approaching synchronism as the exciting current in the coil 107 is increased. This class of inductive drive has been disclosed heretofore in the Anthony Winther United States Patent 2,106,542, dated January 25, 1938. By the above means the quill 93 is driven inductively from quill 81.

Keyed to quill 93 are gears 109 and 111. The former is meshed with a gear 113 which is keyed to a counter-shaft 115 supported in bearings 117 and 118 in said housing 89. Thus counter-shaft 115 is driven from the outer or driven quill 93.

The gear 113 rotatably supports governor weights 119 arranged to move outwardly under centrifugal force caused by the rotation of the gear 113. Control members 121 press against a flange 123 of a sleeve 125 on shaft 115, the sleeve 125 carrying a laminated iron armature 127.

The form of the armature 127 is that of a frustrum of a cone. A spring 129 reacts between the armature 127 and the support for the pole pieces 131 normally to push the armature and its supporting sleeve 125 toward the left so that the flange 123 contacts with the roller members 121 to react against the outward movement of the governor weights 119. As the speed of the shaft 115 increases, the governor weights move outwardly to force the sleeve 125 to the right, carrying with it the armature 127. When the speed of the shaft 115 is reduced the reverse effect is obtained under action of spring 129.

Magnetically associated with the armature 127 are three magnetic pole pieces 131, also composed of laminated iron, and carrying exciting coils 133 (Figs. 4 and 10). Two of the poles 131 are of a given polarity and the third one is of opposite polarity. The ends of the poles 131 are formed as segments of a hollow truncated cone in order to accommodate the truncated form of the armature 127 as it moves to the right. By the movement of the magnetic armature 127 to the right, the flux gap between poles 131 is rendered more magnetic, and vice versa, so that if alternating currents be applied to the coils 133, the armature 127 will function as a means for varying the reactance in the circuit which feeds said coils 133. The entire device within the housing 89 which is under control of the governor on the gear 113 will hereinafter be referred to as the variable reactor R.

The shaft 115, as shown in Fig. 10, is connected to a shaft 191 which carries the armature of a motor M, and passes on to a generator G—1 which corresponds in form and in function to the alternating-current generator G, hereinafter described. However, the alternating-current circuit of the generator G—1 is connected only to the circulating fans for circulating air within the car, which fans will be mentioned more specifically hereinafter.

The compressor 79 is driven from a counter-shaft 135 and a coupled shaft 189. To shaft 135 is keyed a spur gear 137 which is driven from said pinion 111 keyed to the driven quill 93. The counter-shaft 135 is supported on opposite bearings 139 within said housing 89.

On the driven end of the driving quill 81 is keyed an armature of special form. This armature consists of clamping rings 141 which hold a solid annular field member 143 composed of material which may be substantially permanently magnetized. There are various known materials which may thus be magnetized, and among these is a known alloy of aluminum, nickel, cobalt and iron which has the requisite properties. The armature member 143 is variably magnetized by means, which will be described hereinafter, to provide alternate north and south magnetic poles on its smooth, cylindrical exterior. The number of pairs of poles is a matter of design, two of each polarity being used in the present example. Fig. 16 diagrammatically illustrates the magnetic polarization characteristics of the armature 143.

The polarized armature 143 rotates within inductor or generator windings 145, these being wound upon suitable magnetic cores 147 and being adapted by the rotation of the armature 143 to have alternating currents induced therein. Hereinafter the rotating armature 143, together with the coils 145 will be referred to generally as an alternating-current generator G.

The generator windings 145 are placed in the same alternating-current circuit 149 as are the reactor coils 133 of the reactor R (Fig. 10). This alternating-current circuit 149, which connects the reactor coils 133 and the generator coils 145, also connects the opposite sides of a bridge rectifier, indexed generally at B. The bridge rectifier B consists of four rectifier units 151, 153, 155, and 157. To the other opposite sides of the bridge circuit B is connected a direct-current exciter circuit 159 which has therein a switch 161 and said electromagnetic coil 107.

It will be seen from the above that the alternating current generated by the alternating-current generator G is subject to the variable reactions of the reactor R; whereas direct current would not be thus subject to reactions of such a reactor. On the other hand, it is desirable that the exciting current in circuit 159 be of the direct current variety. This gives the reason for the use of alternating current in circuit 149 and the insertion of the bridge rectifier B.

Tracing the flow of alternating current, it will be seen that when the flow is toward the bridge B between the rectifiers 151 and 153, that flow is resisted by the rectifier 153 but permitted by the rectifier 151 so that current appears in the circuit 159 in the direction of the arrow. This current returns to the alternating-current circuit through rectifier 157. At the same time the rectifiers 155 and 153, prevent the incoming alternating-current surge from passing back to its own circuit 149 without first passing through the direct-current circuit 159.

On the other hand, when the alternating current reverses, the flow is toward the bridge B between the rectifiers 155 and 157, the rectifiers 157 and 151 preventing return to the alternating-current circuit and forcing the flow to take place through the rectifier 155 to the direct-current circuit 159 in the direction of said arrow. Thus, whenever there is alternating current in the alternating-current circuit, there is direct-current in the direct-current circuit.

The switch 161 in the direct-current circuit is closed whenever the arm 77 is thrown toward the left, this condition prevailing when the bell-crank 53 is rotated counterclockwise by the vacuum on piston 59. Thus, whenever a requirement exists for driving the compressor 79 for cooling purposes, the frame 25 is depressed to obtain a large driving effect between the drum 13 and tire 17, and at the same time the direct-current circuit 159 is closed so that the exciting coil 107 may be energized. The increased effective driving torque is then delivered through the energized electromagnetic inductor clutch I.

The coil 107 is promptly energized, because, whenever the tire 17 is rotated (whether under mechanical or gravity pressure), the alternating-current generator G is in operation to apply alternating current potential in the alternating-current circuit 149. Even when the car is cold (suction port 69 open) and switch 161 open, potential is applied to circuit 149, the drive to tire 17 being by means of the gravity contact between drum 15, tire 17, then through gears 43 and 45, drive shaft 49, quill 81, and to the armature 143.

On the other hand, the driven member 91 will not be induced into motion until the coil 107 is energized, and this is not the case until the thermostatic control member 75 heats and closes port 69 and causes a vacuum to operate the piston 59, so that a heavier driving pressure is obtained between the drum 15 and tire 17. At the same time, the direct-current circuit is closed at switch 161. As the driving speed under these conditions is increased, the governor weights 119 force the armature 127 of the reactor farther toward the poles 131, thus to increase the reactance in the alternating-current circuit 149. Thus the alternating current in circuit 149 is prevented from building up too fast with increase in vehicle speed.

This also prevents the direct current in the direct-current circuit 159 from building to too great a value. Therefore, with increased speed there is an increased percentage of slip at the inductor I, with the result that compressor 79 at various car speeds is operated at a relatively constant speed through inductor 91, quill 93, gears 111, 137 and shafts 135 and 189.

Heating means which is independent of compressor operation is shown in Fig. 10 and comprises a circuit including a contact 90 above the bi-metal thermostat 75, the bi-metal forming another contact to make a switch which is open when the thermostat 75 is hot, and closed when the thermostat is cold. The circuit includes a lead 92 from the contact 90 to the alternating-current connection between rectifiers 151 and 153. Another lead 94 goes from the other side of the thermostat switch, through heating coils or grids 96 (located in the car) to the other alternating-current connection between rectifiers 155 and 157.

The thermostat has a midposition (between 32° and 40° F.) at which both the port 69 is open and the contact 90 is open. But when the car over-cools (below 32° F.), the contact 90 closes and heating occurs. When the car overheats (above 40° F.), the port 60 closes and cooling starts, as will be shown.

Cars such as the one described are often sent into sidings near orchards and the like and are there loaded. Under such circumstances, the cars, not being in motion, require an auxiliary drive for the compressor 79. This is provided by means of a small gasoline engine 160 which carries therewith a small gasoline supply and a starting crank 10.

The engine 160 is connected with the drive shaft 169 of a centrifugal clutch 171 (Figs. 8, 9 and 10). This clutch consists of a spider 173 associated with the engine shaft 169. The spider 173 carries radially springing friction shoes 175, each riveted at one end 14 to the spider and normally retracted at the other end by means of spring 177. The springs react between the rim of spider 173 and the heads of studs 16 fastened near the other ends of the shoes 175. Under centrifugal force due to increased velocity, the sprung ends of the shoes 175 engage the inner frictional surface 179 of a driven drum 181 fastened to a shaft 183 which carries a bevel pinion 185 meshed with a bevel gear 187. The gear 187 forms a component portion of the member on which is the spur gear 137. Thus, at a predetermined speed after starting of the engine 160, it is automatically connected to the compressor drive. As is the case with the drive from the running gear of the car, the engine drive to the compressor 79 is through the countershafts 135 and 189.

Referring to Fig. 13, compressor 79 has a suction inlet 197 and a compression outlet 199, the latter leading to a valve 201 which is under control of the apparatus shown in Fig. 17 and adapted to assume one of two positions. In one (refrigerating) position the compression outlet 199 is in connection with a line 205 leading to the condenser 207. From the condenser 207 a line 209 leads to a receiver 211. The condenser 207 and receiver 211 are located on the outside of the car and beneath as shown in Figs. 1 and 2, and are subject to cooling action of the fan 193 in connection with the natural draft due to car movement when the car moves.

From the receiver 211, cooled liquid refrigerant flows over a line 213 and reaches both of two expansion valves 215 and 217. A heat exchanger 18 is desirable though not a necessity. By its means the refrigerant may deliver up heat to the suction line of the compressor. The expansion valve 215 may expand refrigerant through coils 219 within cylindric, hold-over brine tanks 221, the valve 215 being under control of a thermostat 223 which responds to the temperature of the refrigerant leaving coil 219. From the coils 219 the expanded gas may return to the suction line 197 by way of a return line 225 and a check valve 227. The thermostat 223 is arranged to gradually open the valve 215 as the temperature drops. At freezing, the valve 215 is wide open.

The fluid that gets to the expansion valve 217 may expand through a coil 229 which is a direct-cooling coil for cooling the atmosphere without any intermediate brine or the like. The expansion valve 217 is under control of a thermostat 231 which responds to temperature rise of the coils 229 to open valve 217. Expanded fluid from the coils 229 can return to the suction line 197 of the compressor 79 via lines 233, 225 and check valve 227.

The purpose of the direct-cooling coil 229 is to first assume the refrigerating load and cause the temperature of the car to be reduced quickly when the cooling apparatus starts, and the purpose of the indirect cooling coils 219 in the brine tank 221 is to take up the refrigerating load as the temperature drops and to comprise a hold-over for periods when the compressor 79 is idle, as during short periods when the car is stopped at way stations and the like.

A circulating fan 237 energized from the alternating-current generator G—1 (Fig. 10) serves to circulate the cooled air throughout the car. Cooling by means of the brine tanks 221 is by convection from said fan 237 in the compartment which the plurality of tanks traverse (Figs. 1 and 2).

It is also desirable to have the apparatus arranged so that if the car goes from a warm into a cool climate, that the car is automatically heated. This is done by providing a second line 239 from the valve 201 so that the compression line 199 into the compressor may be automatically connected thereto when automatically disconnected from the condenser line 205. This occurs whenever the natural cooling of the car is too great. Under such circumstances, the fluid which is normally a refrigerant is compressed into the line 239 and led to a heater coil 241.

The heat of compression is dissipated from the coil 241 to the car to function as a heating medium. A fan 243 energized from said generator G—1 (Fig. 10) is used to circulate air through the coil 241 to be warmed. The check valve 235 which forms the outlet for the heating coil 241 permits the warm gas to flow to the line 245 and then to the valves 215 and 217. Valve 217 is closed, but under cool conditions the valve 215 is open in response to the operation of its thermostat 223. The gas then finds its way through the open expansion valve 215, coils 219, through lines 219, 225, valve 227, line 197 and back to the compressor 79. Under cooling conditions the brine tanks 221 are seldom over one-half frozen. But under heating conditions enough heat is abstracted by coil 241 that the gas in expanding through valve 215 cools and causes the brine in the tanks 221 to freeze up entirely. In short, the latent heat of fusion of the water is all abstracted and delivered up to the car, besides the heat of compression of the compressor.

The operating settings for Fig. 13 are tabulated directly beneath it. Under normal cooling conditions the valve 201 is opened to the condenser 207. The expansion valves 215 and 217 are each partially open. The warmer it is, the more valve 217 is open and the less valve 215 is open. The check valve 235 is closed to the left. The direct expansion coil 229 is operating. The indirect expansion coils 219 are operating to cool the brine in the brine tanks 201. The heating coil 241 is inoperative. The fan 237 is running and so is the fan 243; fan 237 draws air over tanks 221 and forces it through coil 229. Fan 243 draws air over tanks 221 for cooling.

Under heating conditions the valve 201 is open to the heating coils 241. The expansion valve 215 is open. The expansion valve 217 is closed. The check valve 235 is open due to pressure from the left. The direct cooling coil 229 is inoperative. Both fans 237 and 243 are running while the heating coil 241 is operating. Heat is being abstracted from the brine in tanks 221 at low temperature and ultimately delivered to the load in the car by passing to the compressor from which it is delivered with the heat of compression at high temperature to the heating coil 241. From coil 241 all of the heat is dissipated at higher temperature to the load.

It will be clear from Fig. 13 that if the connection between lines 199 and 205 be maintained without valve 201 being used, that the apparatus is useful as refrigerating apparatus per se, and that in such case the line 239, heating coil 241, fan 243 and return check valves 235 may be eliminated. In such case the form of thermostat valve 75, 73, 69 (shown in Fig. 10) is sufficient. When, however, the heating elements are used (as illustrated in Fig. 13) then the valve 201 or its equivalent must be used. This requires the apparatus shown in Fig. 17 (also illustrated in Fig. 13) which responds to both heating and cooling in the car. So far as its functions under cooling requirements are concerned, this apparatus is equivalent to the parts with corresponding numerals in Fig. 10. The corresponding reference numerals indicate this. However, so far as the added functioning under heating requirements are concerned, different reference characters have been applied as follows (see Figs. 13 and 17):

Numeral 78 indicates a pipe to a cylinder 80 in which is a piston 82 normally biased, as by a spring 84 to move a mechanism to set the valve 201 to the solid-line position shown, which is its "refrigerating" position. At this time no vacuum is in the cylinder 80, because the bellows 76 is either in the position shown (32° to 40° F. in the car), or it may be expanded (at above 40° F. in the car) to shut the pipe 71 (but not pipe 78). Under the latter condition it does two things; (1) causes full driving torque to the compressor 79 by reason of suction in the line 71; and (2) sets the valve 201 to the solid-line position (see also Fig. 13) so that the compressor functions through the refrigeration circuit to cause cooling.

If the bellows 76 shrinks, as upon excessive cooling (below 32° F.), then the valve 73 (Fig. 17) seats to the right to close off both pipes 71 and 78. Thus not only is a driving torque transmitted to the compressor 79 but a vacuum in cylinder 80 draws piston 82 to the right, thus resetting valve 201 to the dotted-line position so that the compressor operates through the heating elements of the Fig. 13 circuit.

From the above, it will be seen that when the thermostat of Fig. 10 is used that it is intended (a) that the heating elements 239, 241, 243 and 235 of Fig. 13 shall not be used; and (b) that valve 201 is not necessary. However, when both a cooling and a heating car is desired, then the valve 201 of Fig. 13 is necessary, together with the type of thermostatic control shown in Figs. 13 and 17.

The engine is ignited by means of a magneto 163 which includes a short-circuiting line 165 leading to a switch 167. One contact of the switch 167 is on the arm 77 of the bell-crank 53, the said contact being grounded at the support for the arm, as shown at 12. Thus if, after the engine 161 has been started at a location to effect pre-cooling of the car as it is loaded, and said engine is left running by the operator when the train starts into motion, the picking up of the compressor drive by the drive from the running gear of the car, results in automatically killing the engine 161 through closure of the short-circuiting switch 167 in the circuit 165 of the magneto 163. As the engine dies, the centrifugal clutch 171 automatically opens, so that the engine is not driven while the compressor is under control of the drive from the car running gear.

Another feature to be noted in connection with the engine 161 is that it is geared to the governor countershaft 115 through the compound gear train consisting of gears 185, 187, 137, 111, 109 and 113. The purpose of this is not to operate the reactor R, which at the time of operation of engine 161 is dead, due to inactivity of the alternating-current generator G, but to operate the other alternating-current generator G—1 (Fig. 10) through shafts 115 and 191.

On the shaft 191 is also the armature of the stand-by motor M, the electrical leads of which are adapted to be plugged into an ordinary lighting circuit when the car is not in motion but is at a location where such a circuit is available. Under these conditions the stand-by motor M will be energized to drive the compressor and generator G—1, the former through shafts 191, 115, gears 113, 109, 111, 137 and shafts 135, 189. The motor M operating under substantially constant current voltage conditions will operate at a constant speed and requires no governing control. Inasmuch as the car is not moving, the governing controls are dead at this time.

A fan 193 in a housing 195 (Fig. 3) is used for condenser cooling purposes, as will be described, and is driven when the drive is by vehicle movement, or by the engine, or by the stand-by motor M.

The compressor 79 is such as to be equally effective when driven in either direction. Hence forward or backward movement of the car serves effectively to drive it.

The refrigerating apparatus which is to be actuated by means of said compressor 79 is shown diagrammatically in Fig. 13. This figure illustrates the arrangement of parts at one end of the car, but it is to be understood that a corresponding arrangement of parts in parallel is located in the opposite end of the car, and that as many parallel components may be used as may be desirable. Two components are shown, one in each opposite end of the car in Figs. 1 and 2.

In Figs. 11 and 12 is shown an alternative form in which like numerals designate like parts. Cooling is effected as above described by means of compressor 79 and its refrigerating circuit. The heating coil 241 and its connections of Fig. 13 are omitted. Heating in this case is effected by means of a toothed rotor 257. This toothed rotor 257 is driven from an extension 259 from quill 81 (Fig. 8) which, as it will be recalled, rotates continuously as the car moves. This rotor 257 (which is also shown in Fig. 12) rotates within a housing 260 in which is located a peripheral electromagnetic coil 261, the latter setting up a toric field which passes through the case and through the rotor 257. The distorting effect of teeth 263 of the rotor 257 on the magnetic field in the housing 260 causes the eddy currents therein to set up heating. The heat is carried off by water which flows through water circulating passages 265 and through a hot-water heating circuit 267. It should be understood that the casing 260 is held against rotation so that the work done by the rotor 257 is converted into heat, instead of into kinetic energy, as is the case of the electromagnetic clutch I.

Further details in regard to the theory of the heating action of a rotor such as 257 may be found by reference to said Patent 2,106,542.

The heating circuit 267 passes through heating coils 269 which are suitably positioned adjacent to a fan 271 for distribution of heat to the car.

The fan 271 is energized by direct current over a circuit 273 which receives current from the direct current side of the rectifier B. A branch circuit 275 serves to energize the electromagnetic coil 261 on the electromechanical converter which will be hereinafter generically indicated by the index K.

The circuit 273, as well as the branch circuit 275 is under control of a thermostatic element 277 which is responsive to temperature conditions within the car. When the temperature becomes too low, the thermostat 277 closes, whereby the converter K is energized and the fan 271 turned on. When the temperature rises to a predetermined point, the thermostat 277 cuts out the heating circuit. The advantage of this form of heater is that the compressor 79 needs not be operated under cold weather conditions when its oil is stiff and when there are like disadvantages. Some classes of this apparatus become very stiff in cold weather and become wasteful to drive.

In Figs. 14 to 16 is shown the magnetizing device whereby the cylindric rotor 143 is magnetized. The apparatus comprises a magnetic ring 249 with south poles 251 and north poles 253. The poles are magnetized by windings 255. Their ends are arcurately formed on radii, as shown. The respective radii of the ends of the poles 251 and 253 are greater than the radius of the surface on the cylindric rotor which is to be magnetized. For instance, with a radius of 5.5" for the rotor, a radius of 6.20" is chosen for the arcuate form of each pole 251 and 253. However, the opposite centers of the poles are at distances which cause them to tangently contact the surface of the rotor. The subtended arc of the poles 251 and 253 with the center of the rotor 243 as reference are of the order of 63°.

The reason for giving the above dimension is not by way of limitation but my way of example. When the cylindric rotor 143 is placed in the position shown in Fig. 14 within the poles 251 and 253 and the current turned on, the flux which emanates from the poles 251 and 253 induces polarization whose characteristics are such that when the rotor rotates within the field coils 145 (Fig. 8), an alternating current of sine wave characteristics is formed.

It will be understood that with other numbers of poles that different constants need to be chosen to effect a sine wave, the ones here indicated being effective to produce a sine wave under the conditions set forth. Other wave forms may also be formed by suitable modifications.

It will be seen that whenever the vehicle stops, that the suction pump 35 stops so that under normal leakage conditions it may be difficult to maintain a vacuum in the line 63. This means that the switches 161 and 167 will automatically become open so that the engine 160 may be started if desired. Furthermore, the electrical circuit being dead, the motor M may be plugged in if this be desired. A further advantage in this respect is that the bell-crank 53 is not in a position to press down the tire 17, which would be undesirable in a hot condition of the car if stoppage were for long periods, because this would deform the tire at point of contact.

Among the advantages of the invention may be noted the provision of a quickly responsive electrical control means which in the transmission per se involves but one contact at the switch 161. The contact 167 is in an auxiliary circuit associated with the auxiliary engine 160. Furthermore, this single contact at 161 is not called upon to operate very often. This advantage arises from the new combination of the inductor drive with an energizing circuit which has an alternating-current portion in which a reaction control may be effected, and which also has a direct-current circuit for the actual energization of the inductor. The latter inductor circuit being of direct-current type avoids all the complications incident to using an alternating current in an inductor drive. The absence of electrical contacts lends itself to great reliability in operation under adverse conditions, such as are met with in freight car refrigerating practice.

The combined refrigerating and heating system is effective to maintain the load in proper condition at all times.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. In apparatus of the class described, driving means, driven means, an electromagnetic clutch between the driving and the driven means, a circuit for energizing said clutch, said circuit having an alternating-current section and a direct-current section, a rectifier connecting said sections, an alternating-current generator in said alternating-current section driven from said driving means, a reactor in said alternating-current circuit section, a speed responsive governor driven from said driven means and controlling said reactor to increase the reactance in the alternating-current section with incipient increase in speed of the driven means, whereby the rectified current in said direct-current section for energizing the electromagnetic clutch is prevented from rising directly with increase in speed of said driving means.

2. In apparatus of the class described, driving means, driven means, an electromagnetic clutch between the driving and the driven means, a circuit for energizing said clutch, said circuit having an alternating-current section and a direct-current section, a rectifier connecting said sections, an alternating-current generator in said alternating-current section driven from said driving means, a reactor in said alternating-current circuit section, a speed responsive governor driven from said driven means and controlling said reactor to increase the reactance in the alternating-current section with incipient increase in speed of the driven means, whereby the rectified current in said direct-current section for energizing the electromagnetic clutch is prevented from rising directly with increase in speed of said driving means, and temperature-responsive means for breaking the current in the direct-current section of the circuit to deenergize the clutch.

3. In apparatus of the class described, driving means, driven means, an electromagnetic clutch between the driving and the driven means, a circuit for energizing said clutch, said circuit having an alternating-current section and a direct-current section, a rectifier connecting the sections, an alternating-current generator in said alternating-current section driven from said driving means, a reactor in said alternating-current circuit section, a speed responsive governor driven from said driven means and controlling said reactor to increase the reactance in the alternating-current section with increase in speed of the driven means, whereby the rectified current in said direct-current section for energizing the electromagnetic clutch is reduced in proportion with increase in speed of said driving means, a switch in said direct-current section, and means responsive to temperature simultaneously to open said switch and to place said drive means in condition not to drive said driven means as said clutch becomes incapable of transmitting movement.

4. In a vehicle, road wheels, driving means, variable friction means connecting the driving means for receiving power from said wheels, driven means, an electromagnetic clutch between the driving and the driven means, a circuit for energizing said clutch, said circuit having an alternating-current section and a direct-current section, a rectifier connecting the sections, an alternating-current generator in said alternating-current section driven from said driving means, a reactor in said alternating-current section, a speed responsive governor driven from said driven means and controlling said reactor to increase the reactance in the alternating-current section with increase in speed of the driven means, whereby the rectified current in said direct-current section for energizing the electro-magnetic clutch is proportionally reduced with increase in speed of said driving means, a switch in said direct-current section, and means responsive to temperature simultaneously to open said switch and to decrease the driving friction of said connecting means, and vice versa.

5. In apparatus of the class described, driving means, driven means, an electromagnetic clutch between the driving and the driven means, a circuit for energizing said clutch, said circuit having an alternating-current section and a direct-current section, a rectifier connecting said sections, an alternating-current generator in said alternating-current section driven from said driving means, a reactor in said alternating-current section, a speed responsive governor driven from said driven means and controlling said reactor to increase the reactance in the alternating-current section with increase in speed of the driven means, whereby the rectified current in said direct-current section for energizing the electromagnetic clutch is reduced with increase in speed of said driving means, generating windings in said generator in said alternating-current section, and a field member in said generator comprising a permanent magnet.

6. In apparatus of the class described, an alternating-current circuit, a rectifier therein, a direct-current circuit fed from said rectifier, an alternating-current generator having generating windings in said alternating-current circuit, a permanently magnetized field member in said generator, a driving means for said field member, driven means, a reactor in said alternating-current circuit, centrifugal means for changing the reactance in said reactor, which is responsive to the speed of the driven means, and an electromagnetic clutch between said driving and said driven means adapted to be energized by said direct-current circuit.

7. In apparatus of the class described, an electromagnetic clutch, an alternating-current circuit, a rectifier therein, a direct-current circuit fed from said rectifier and energizing the clutch, an alternating-current generator having generating windings in said alternating-current circuit, a permanently polarized armature in said generator, a driving means for said clutch and moving the armature of the generator, a reactor in said alternating-current circuit, centrifugal control means for said reactor responsive to the speed of the driven means, said electromagnetic clutch being adapted to be energized by said direct-current circuit, and means for simultaneously opening said direct-current circuit and incapacitating said driving means.

8. In a refrigerator vehicle, an electromagnetic clutch, an alternating-current circuit, a rectifier therein, a direct-current circuit fed from said rectifier, an alternating-current generator having generating windings in said alternating-current circuit, a permanently magnetized armature in said generator, a driving means for said clutch and moving said armature, a reactor in said alternating-current circuit, centrifugal means for changing the reactance in said reactor responsive to the speed of the driven means, said electromagnetic clutch being adapted to be energized by said direct-current circuit, work means driven by said driven means adapted to control temperature, and means for simultaneously opening said direct-current circuit and incapacitating said driving means responsive to a predetermined low temperature.

9. In apparatus of the class described, an alternating-current circuit, a rectifier therein, a direct-current circuit fed from said rectifier, an alternating-curent generator having generating windings in said alternating-current circuit, a permanently polarized armature in said generator, driven means controlling the armature, driving means therefor, a reactor in said circuit, centrifugal means for controlling said reactor responsive to the speed of the driven means, an electromagnetic clutch between said driving and said driven means adapted to be energized by said direct-current circuit, a variable-torque transmission to said driving means adapted normally under low torque conditions to continuously drive said generator, a vacuum pump driven by said driving means, a switch in said direct-current circuit, and temperature responsive means adapted to break the vacuum in said pump upon cooling and to hold it upon heating, and means whereby said vacuum effects closure of said switch and increase in driving torque.

10. In apparatus of the class described, driving means, driven means, an electromagnetic clutch between the driving and driven means, an alternating-current generator connected with the driving means, an alternating-current circuit fed by said generator, a direct-current circuit connected to the clutch, a rectifier connecting the said circuits, a variable reactor in said alternating-current circuit, and governor means responsive to motion of said driven means and adapted to increase the reactance in said alternating-current circuit with incipient increase in speed of the driven means.

11. In apparatus of the class described, an electromagnetic clutch, a driving means for the clutch, an alternating-current generator connected with the driving means, an alternating-current circuit fed by said generator, a direct-current circuit connected to the clutch, a rectifier connecting the said circuits, a variable reactor in said alternating-current circuit, and governor means responsive to motion of said drive and adapted to increase the reactance in said alternating-current circuit with incipient increase in speed.

12. In apparatus of the class described, driving means, driven means, an electromagnetic clutch between the driving and driven means, an alternating-current generator connected with the driving means, an alternating-current circuit fed by said generator, a variable reactor in said circuit, governor means responsive to motion of said driven means and adapted to increase the reactance in said circuit with incipient increase in speed of the driven means, a field coil for energizing said electromagnetic clutch, a direct-current circuit therefor, and a rectifier between said alternating-current circuit and said direct-current circuit, the alternating-current circuit feeding current to the direct-current circuit.

13. In apparatus of the class described, driving means, driven means, an electromagnetic clutch between the driving and driven means, an alternating-current generator connected with the driving means, an alternating current circuit fed by said generator, a direct-current circuit connected to the clutch, a rectifier connecting the said circuits, a variable reactor in said alternating-current circuit, governor means responsive to motion of said driven means and adapted to increase the reactance in said alternating-current circuit with incipient increase in speed of the driven means, and work means driven from said driven means and adapted to be driven at a substantially constant rate.

14. In apparatus of the class described, a driving means, a driven means, an electromagnetic clutch coupling said means, an alternating-current generator driven from the driving means, an alternating-current circuit fed by said alternating current generator, a direct-current circuit connected to the clutch, a rectifier connecting the said circuits, a governor, a reactor in said alternating-current circuit responsive to said governor to increase reactance in the alternating-current circuit upon incipient increase in speed, said governor and said alternating-current generator being responsive to movement caused by said driving means.

15. In apparatus of the class described, a driving means, a driven means, an electromagnetic clutch coupling said means, an alternating-current generator driven from the driving means, an alternating-current circuit fed by said alternating-current generator, a direct-current circuit connected to the clutch, a rectifier connecting the said circuits, a governor, a reactor in said alternating-current circuit responsive to said governor to increase reactance in the alternating-current circuit upon increase in speed, said governor and said alternating-current generator being responsive to movement caused by said driving means.

16. In a vehicle, wheels, driving means, variable torque-transmitting means associated with the driving means for receiving power from said wheels, driven means, a variable clutch between the driving and the driven means, means for variably energizing said clutch to effect a variable coupling, said last-named means effecting the variation in response to speed of said driven means, and means simultaneously to de-energize said clutch and to reduce the driving effect of said transmitting means and vice-versa.

17. In a vehicle, wheels, driving means, variable torque-transmitting means associated with the driving means for receiving power from said wheels, driven means, apparatus operated by said driven means, an electromagnetic clutch between the driving and the driven means, electric means for variably energizing said clutch to effect a variable coupling, said last-named means effecting the variation in response to speed of said driven means, and means simultaneously to de-energize said clutch and to reduce the driving effect of said transmitting means and vice-versa.

18. In a drive, driving means, driven means, an electromagnetic clutch, a mechanical drive from said driving means to said clutch, a mechanical drive from said clutch to said driven means, an alternating-current generator connected with the driving means and adapted to be driven therefrom, an alternating-current circuit from said generator, a direct-current circuit connected to and energizing the clutch, a rectifier connecting said circuits, a reactor connected with said alternating-current circuit, and a governor responsive to move of the driven means controlling said reactor to increase the reactance in said alternating-current circuit when the speed of said driven means tends to increase.

19. In a drive, driving means, driven means, an electromagnetic clutch, a mechanical drive from said driving means to said clutch, a mechanical drive from said clutch to said driven means, an alternating-current generator connected with the driving means and adapted to be driven therefrom, an alternating-current circuit from said generator, a reactor associated with said alternating-current circuit, a governor responsive to movement of the driven means controlling said reactor to increase the reactance in said alternating-current circuit when the speed of said driven means tends to increase, a rectifier fed by said alternating-current circuit, a direct-current circuit fed by the rectifier, and a field coil in the electromagnetic clutch which is fed by said direct-current circuit.

20. In apparatus of the class described, driving means, driven means, an electromagnetic clutch between the driving and driven means, an exciting coil therein, an alternating-current generator connected with the driving means and adapted to be driven therefrom, an alternating-current circuit from said generator, a reactor connected with said alternating-current circuit, means responsive to movement of the driven means adapted to cause said reactor to increase the reactance in said alternating-current circuit when the speed of said driven means tends to increase, a direct-current circuit feeding said exciting coil and connected with said alternating-current circuit, and a rectifier in the connection between circuits.

21. In a vehicle drive, driving means, work means, an electromagnetic clutch, a mechanical driver in said driving means to said clutch, a mechanical driven means from said clutch to said work means, an alternating-current generator connected to and driven by the driving means, an alternating-current circuit fed by said generator, a reactor connected with said alternating-current circuit, a governor responsive to movement of the mechanical driven means adapted to control said reactor to increase the reactance in said alternating-current circuit with increase in speed of said work means, a direct-current circuit for energizing said clutch, a rectifier connecting said circuits, a switch in the direct-current circuit, and temperature responsive means adapted to open and close said switch.

22. In a vehicle drive, driving means, work means, an electromagnetic clutch, a mechanical driver in said driving means to said clutch, a mechanical driven means from said clutch to said work means, an alternating-current generator connected to and driven by the driving means, an alternating-current circuit connected to and fed from said generator, a reactor connected with said alternating-current circuit, a governor responsive to movement of the mechanical driven means adapted to control said reactor to increase the reactance in said alternating-current circuit with increase in speed of said work means, a direct-current circuit for energizing said clutch, a rectifier connected between said circuits, a switch in the direct-current circuit, temperature responsive means adapted to open and close said switch, and means to vary the driving ability of said driving means with opening and closing of said switch.

23. In a vehicle, driving means, driven means, an electromagnetic clutch therebetween, an alternating-current generator connected to and driven by the driving means, alternating-current lines from said generator, a reactor connected with said alternating-current lines, a governor responsive to movement of the driven means adapted to control the reactor to increase the reaction in said alternating-current circuit when the speed of said driven means tends to increase, rectifying means in said alternating-current circuit, and a direct-current circuit fed from said rectifying means and variably energizing said electromagnetic clutch in an inverse ratio to the speed of the driven means.

24. In a vehicle, driving means, driven means, an electromagnetic clutch therebetween, an alternating-current generator connected to and driven by the driving means, alternating-current lines from said generator, a reactor connected with said alternating-current lines, a governor responsive to movement of the driven means adapted to control the reactor to increase the reaction in said alternating-current circuit when the speed of said driven means incipiently increases, rectifying means in said alternating-current circuit, a direct-current circuit fed from said rectifying means and energizing said electromagnetic clutch, a switch in said direct-current circuit, and means responsive to temperature adapted upon abnormally warm conditions to increase the driving capacity of said drive and to cause closure of said switch.

ANTHONY WINTHER.
MARTIN P. WINTHER.
MARK KINDT.